US008967214B2

(12) United States Patent
Kodama

(10) Patent No.: US 8,967,214 B2
(45) Date of Patent: Mar. 3, 2015

(54) PNEUMATIC RADIAL TIRE

(71) Applicant: Toyo Tire & Rubber Co., Ltd., Osaka-shi, Osaka (JP)

(72) Inventor: Norihiko Kodama, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 212 days.

(21) Appl. No.: 13/794,027

(22) Filed: Mar. 11, 2013

(65) Prior Publication Data

US 2013/0240108 A1 Sep. 19, 2013

(30) Foreign Application Priority Data

Mar. 19, 2012 (JP) ................................ 2012-062129

(51) Int. Cl.
*B60C 15/00* (2006.01)
*B60C 15/06* (2006.01)

(52) U.S. Cl.
CPC ............. *B60C 15/06* (2013.01); *B60C 15/0635* (2013.04); *B60C 15/0653* (2013.04); *B60C 2200/06* (2013.04)
USPC ............ 152/543; 152/539; 152/542; 152/540

(58) Field of Classification Search
CPC B60C 15/00; B60C 15/06; B60C 2015/0614; B60C 2015/0657; B60C 2015/066; B60C 2015/0664; B60C 2015/0667; B60C 2015/0671; B60C 2015/0675; B60C 15/0653
USPC .................................................. 152/539–547
See application file for complete search history.

(56) References Cited

U.S. PATENT DOCUMENTS 5,979,528 A 11/1999 Miyazono
6,279,635 B1 8/2001 Miyazono
6,354,351 B1 3/2002 Miyazono

FOREIGN PATENT DOCUMENTS

EP 884200 A2 * 12/1998 .............. B60C 15/06
JP 61105202 A * 5/1986 .............. B60C 15/06
JP 7-164838 A 6/1995
JP 07164838 A * 6/1995 .............. B60C 15/06
JP 11-1107 A 1/1999

OTHER PUBLICATIONS

Machine Translation: JP07-164838; Tomita, Akira; (no date).*

* cited by examiner

*Primary Examiner* — Justin Fischer
*Assistant Examiner* — Kendra Shin
(74) *Attorney, Agent, or Firm* — Westerman, Hattori, Daniels & Adrian, LLP

(57) ABSTRACT

A wind-up side cord of a chafer is arranged in such a manner that an angle of inclination of a first line connecting a first point and a second point with respect to a tire circumferential direction is 20 to 40 degrees, and is formed as a circular arc shape which is convex to an outer side in the tire radial direction, a turn-up side cord of the chafer is arranged in such a manner that an angle of inclination of a second line connecting a third point and a fourth point with respect to the tire circumferential direction is 30 to 50 degrees, and is equal to or less than 5 degrees in a change of the angle of inclination with respect to the tire circumferential direction, and a distance in the tire circumferential direction from a fifth point to the first line is 2 to 12 mm.

3 Claims, 2 Drawing Sheets

4
6Ei
21
25
6
12
4E
6Eo
23
26
24
11
22
11E

PNEUMATIC RADIAL TIRE

BACKGROUND OF THE INVENTION

1. Field of the Invention

The present invention relates to a pneumatic radial tire which is excellent in a durability of a bead portion.

2. Description of the Related Art

Conventionally, in a pneumatic radial tire, particularly in a tire which is used in a heavy vehicle such as an industrial vehicle, a construction vehicle or the like, there is fear that a failure such as a separation or the like is brought about while beginning at a turn-up end of a carcass ply which is turned up around a bead core, and provision of a chafer is generally carried out for improving a durability of a bead portion. The chafer is arranged in such a manner as to enwrap the carcass ply from an inner side in a tire width direction to an outer side, around the bead core (refer, for example, to JP-A-07-164838 and JP-A-11-1107).

In the meantime, in the bead portion, it is known that a shear deformation in a tire circumferential direction is dominant in the inner side in the tire width direction, and on the other hand, a compression deformation in a tire radial direction is dominant in the outer side in the tire width direction. Accordingly, it is possible to improve the durability of the bead portion by effectively carrying out reinforcement against the deformations by the chafer.

In JP-A-07-164838, since an angle of inclination of a steel cord with respect to the tire radial direction of the chafer comes to 0 to 10 degrees in any chafer end portions in the inner side and the outer side in the tire width direction, the reinforcing effect against the shear deformation in the tire circumferential direction is not sufficient particularly in the inner side in the tire width direction.

Further, JP-A-11-1107 is structured such that an angle of inclination of an outermost terminal end portion in the tire radial direction in each of the outer side and the inner side of the tire is in a range between 22 and 35 degrees, and an angle of inclination at a position in each of the outer side and the inner side of the tire in the vicinity of a straight line which is parallel to a tire rotating axis passing through a center of gravity of a cross sectional figure of the bead core has an angle obtained by adding an angle within a range between 5 and 50 degrees to the angle of inclination of the outermost terminal end portion, with regard to the angle of inclination with respect to the tire circumferential direction of the steel cord in the bead reinforcing layer (corresponding to the chafer). According to this structure, it is possible to carry out reinforcement at a certain degree against the deformation in any of the inner side and the outer side in the tire width direction, around the bead core.

However, in the steel cord of the chafer of JP-A-11-1107, since the angle is rapidly changed between the vicinity of the outermost terminal end portion in the tire radial direction, and the vicinity of the straight line which is parallel to the tire rotating axis passing through the center of gravity of the cross sectional figure of the bead core, there has been a fear that a rigidity step is generated in the portion so as to cause a failure.

SUMMARY OF THE INVENTION

Accordingly, an object of the present invention is to provide a pneumatic radial tire which can effectively suppress a deformation in an inner side and an outer side in a tire width direction of a bead portion, and improve a durability of the bead portion.

The object mentioned above can be achieved by the present invention as mentioned below. In other words, in accordance with the present invention, there is provided a pneumatic radial tire including a carcass ply which extends between bead cores arranged in a pair of bead portions, and is turned up to an outer side in a tire radial direction around the bead cores, and a chafer which is arranged around the bead cores in such a manner as to enwrap the carcass ply from an inner side to an outer side in a tire width direction, wherein a wind-up side cord of the chafer positioned in the inner side in the tire width direction is arranged in such a manner that an angle of inclination of a first straight line with respect to a tire circumferential direction is 20 to 40 degrees, the first straight line connecting a first intersecting point intersecting with a tire circumferential line passing through a position which is 7 mm inside in the tire radial direction from an inner end of the chafer, and a second intersecting point intersecting with a tire circumferential line passing through an innermost end in the tire width direction of the bead core, and is formed as a circular arc shape which is convex to an outer side in the tire radial direction between the first intersecting point and the second intersecting point, wherein a turn-up side cord of the chafer positioned in the outer side in the tire width direction is arranged in such a manner that an angle of inclination of a second straight line with respect to the tire circumferential direction is 30 to 50 degrees, the second straight line connecting a third intersecting point intersecting with a tire circumferential line passing through a position which is 7 mm inside in the tire radial direction from an outer end of the chafer, and a fourth intersecting point intersecting with the tire circumferential line passing through the innermost end in the tire width direction of the bead core, and is equal to or less than 5 degrees in a change of the angle of inclination with respect to the tire circumferential direction between the third intersecting point and the fourth intersecting point, and wherein a tire circumferential line passing through a position which is 20 mm outside in the tire radial direction from the second intersecting point intersects with the wind-up side cord at a fifth intersecting point, and a distance in the tire circumferential direction from the fifth intersecting point to the first straight line is equal to or more than 2 mm and equal to or less than 12 mm.

In the pneumatic radial tire according to the present invention, the wind-up side cord of the chafer which is positioned in the inner side in the tire width direction is formed as the circular arc shape which is convex to the outer side in the tire radial direction, thereby preventing a rigidity step due to a rapid angle change. Further, since it is possible to appropriately make the angle of the cord with respect to the tire circumferential direction small in the vicinity of the inner end of the chafer, by setting the distance in the tire circumferential direction from the fifth intersecting point to the first straight line to the range mentioned above, it is possible to effectively suppress the shear deformation in the tire circumferential direction. On the other hand, the wind-up side cord of the chafer which is positioned in the outer side in the tire width direction is formed approximately as the linear shape, and therefore the angle of inclination of the cord with respect to the tire circumferential direction does not become too small in the vicinity of the outer end of the chafer, thereby effectively suppressing the compression deformation in the tire radial direction. Therefore, according to the present invention, it is possible to effectively suppress the deformation of the bead portion in the inner side and the outer side in the tire width direction, thereby improving the durability of the bead portion.

In the above structure, it is preferable that the wind-up side cord between the first intersecting point and the second intersecting point is formed as a circular arc shape having a radius of curvature which is equal to or more than 100 mm and equal to or less than 350 mm. According to this structure, it is possible to appropriately make the angle of the cord with respect to the tire circumferential direction small in the vicinity of the inner side of the chafer, thereby well suppressing the shear deformation in the tire circumferential direction.

In the above structure, it is preferable that a tire circumferential line positioned at the midpoint of a tire circumferential line which passes through the third intersecting point and a tire circumferential line which passes through the fourth intersecting point intersects with the turn-up side cord at a sixth intersecting point, and a distance in the tire circumferential direction from the sixth intersecting point to the second straight line is equal to or more than 0 mm and equal to or less than 3.0 mm. According to this structure, it is possible to appropriately hold the angle of inclination of the cord with respect to the tire circumferential direction in the vicinity of the outer end of the chafer, thereby well suppressing the compression deformation in the tire radial direction.

DETAILED DESCRIPTION OF THE PREFERRED EMBODIMENTS

Figure 1:
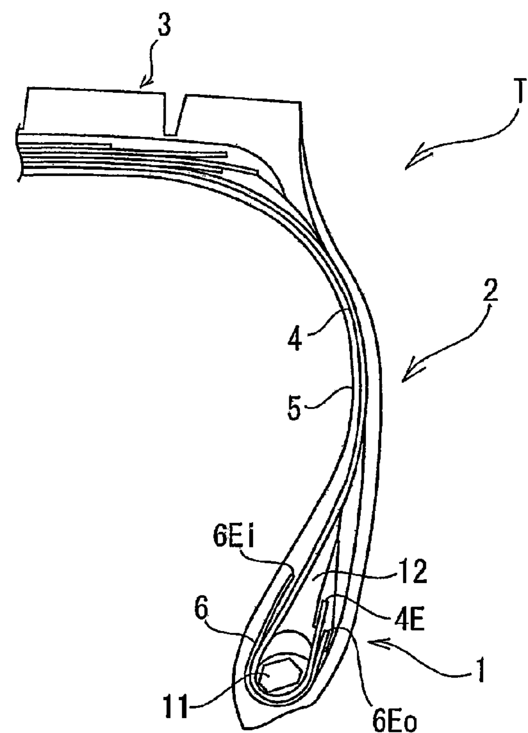
FIG. 1 is a half cross sectional view of a tire meridian and shows an example of a pneumatic radial tire according to the present invention.
Figure 2:
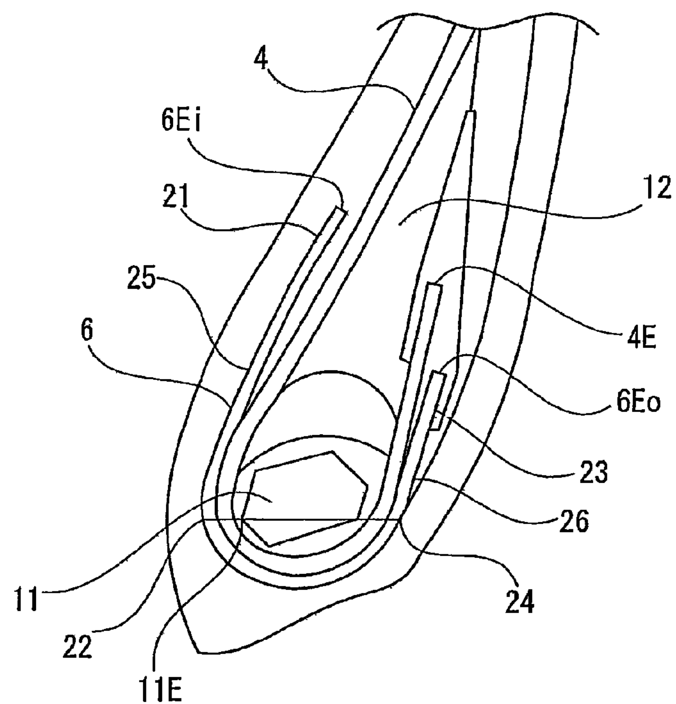
FIG. 2 is a view showing a bead portion of the tire in FIG. 1 in an enlarged manner.

A description will be given below of an embodiment according to the present invention with reference to the accompanying drawings. A pneumatic radial tire T shown in FIGS. 1 and 2 is provided with a pair of bead portions 1, side wall portions 2 which extend to outer sides in a tire radial direction from the bead portions 1, and a tread portion 3 which is connected to outer ends in the tire radial direction of the side wall portions 2 and constructs a wheel tread. In the bead portion 1, there are arranged an annular bead core 11 which is constructed by a converged body obtained by laminating and winding a rubber coated bead wire, and a bead filler 12 which is positioned in an outer side in the tire radial direction of the bead core 11.

A carcass ply 4 extends between the bead cores 11 which are arranged in a pair of bead portions 1, and is turned up to an outer side in the tire radial direction around the bead core 11. Reference symbol 4E denotes a turn-up end of the carcass ply 4. The carcass ply 4 is formed by coating a ply cord arranged in a direction which is approximately orthogonal to a tire circumferential direction, with a topping rubber. As the ply cord, a steel cord, and an organic fiber cord such as a polyester, a rayon, nylon, an aramid or the like are preferably used.

An inner side of the carcass ply 4 is provided with an inner liner 5 which constructs an inner circumferential surface of the tire T. The inner liner 5 has a function of blocking a transmission of gas which is filled in the tire.

A chafer 6 is arranged in such a manner as to enwrap the carcass ply 4 from the inner side in the tire width direction to the outer side, around the bead core 11. Reference symbol 6Ei denotes an inner end of the chafer 6 which is positioned in the inner side in the tire width direction, and reference symbol 6Eo denotes an outer end of the chafer 6 which is positioned in the outer side in the tire width direction.

In the tire T according to the embodiment, the inner end 6Ei of the chafer 6 is arranged in the outer side in the tire radial direction than the turn-up end 4E of the carcass ply 4. Accordingly, it is possible to effectively suppress a failure such as the separation or the like in the turn-up end 4E of the carcass ply 4. It is sufficient that a positional relationship mentioned above is established at a time of being installed to a prescribed rim. The time of being installed to the prescribed rim indicates a state in which the tire is installed to a standard rim which is defined by JATMA in accordance with a tire size, and is set to an internal pressure which is defined by JATMA.

Figure 3:
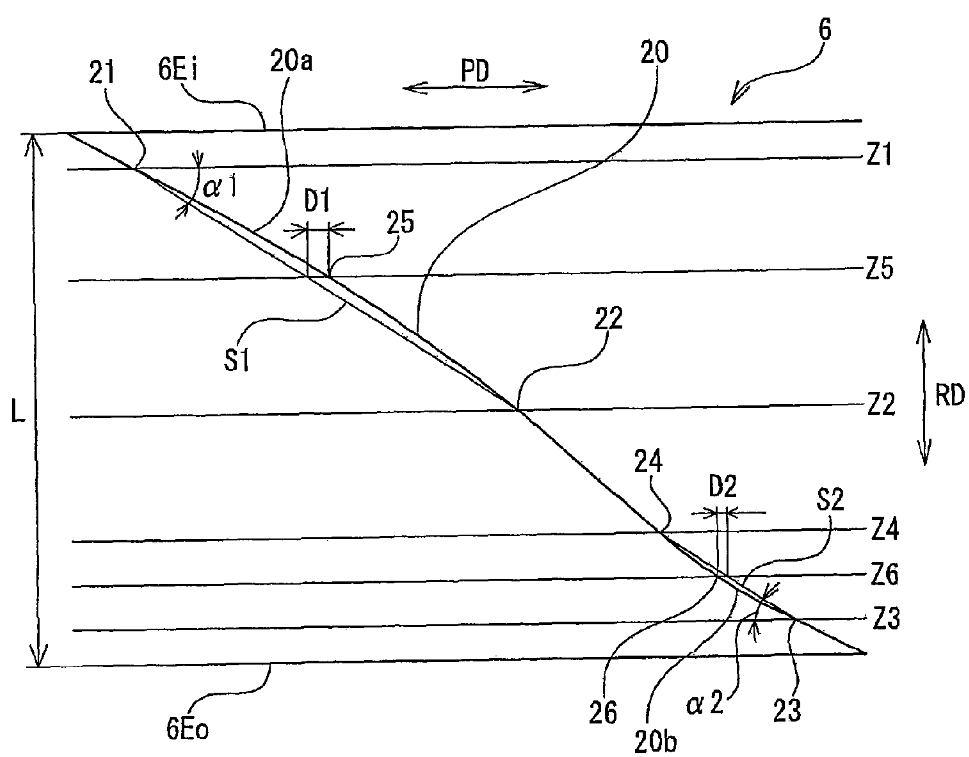
FIG. 3 is an expansion plan view of a chafer.

FIG. 3 is an expansion plan view showing a part of the chafer 6, in which a vertical direction corresponds to a tire radial direction RD, and a lateral direction corresponds to a tire circumferential direction PD. The chafer 6 is formed by coating a plurality of cords 20 which are arranged diagonally with respect to the tire radial direction RD, with a topping rubber, however, only one cord 20 is shown in FIG. 3 for convenience of description. The cord 20 may be constructed by an organic fiber cord; however, the cord 20 is preferably constructed by a steel cord in the light of enhancement of a reinforcing effect. A length L from the inner end 6Ei of the chafer 6 to the outer end 6Eo is equal to or more than 50 mm and equal to or less than 120 mm.

In the cord 20 arranged in the chafer 6, a portion which is positioned in the inner side in the tire width direction is set to a wind-up side cord 20*a*. A point at which the wind-up side cord 20*a* intersects with a tire circumferential line Z1 passing through a position which is 7 mm inside in the tire radial direction from the chafer inner end 6Ei is set to a first intersecting point 21. Further, a point at which the wind-up side cord 20*a* intersects with a tire circumferential line Z2 passing through an innermost end 11E in the tire width direction of the bead core 11 is set to a second intersecting point 22. At this time, the wind-up side cord 20*a* is arranged in such a manner that an angle $\alpha$1 of inclination of a virtual first straight line S1 connecting the first intersecting point 21 and the second intersecting point 22 with respect to the tire circumferential direction PD is between 20 and 40 degrees. The wind-up side cord 20*a* is preferably arranged in such a manner that the angle $\alpha$1 of inclination is between 25 and 35 degrees. If the angle $\alpha$1 of inclination of the wind-up side cord 20*a* is smaller than 20 degrees, an interlayer strain becomes larger with respect to the carcass ply 4, and a deterioration of the durability is caused. On the other hand, if the angle $\alpha$1 of inclination of the wind-up side cord 20*a* is larger than 40 degrees, a shear strain in the circumferential direction becomes larger in the chafer end.

The wind-up side cord 20*a* is formed as a circular arc shape which is convex to an outer side in the tire radial direction between the first intersecting point 21 and the second intersecting point 22. At this time, the wind-up side cord 20*a* between the first intersecting point 21 and the second intersecting point 22 is preferably formed as a circular arc shape having a radius of curvature which is equal to or more than 100 mm and equal to or less than 350 mm, and is more preferably formed as a circular arc shape having a radius of curvature which is equal to or more than 200 mm and equal to or less than 350 mm. If the radius of curvature is smaller than 100 mm, the angle of inclination tends to rapidly change in the boundary between the wind-up side cord 20*a* and a turn-up side cord 20*b* (details of which will be mentioned later). On the other hand, if the radius of curvature is larger than 350 mm, the angle of inclination of the wind-up side cord 20*a* with respect to the tire circumferential direction PD becomes larger in the vicinity of the inner end 6Ei of the chafer. Therefore, the effect of suppressing the shear deformation in the tire circumferential direction PD is small.

Further, a tire circumferential line Z5 passing through a position which is 20 mm outside in the tire radial direction from the second intersecting point 22 intersects with the wind-up side cord 20*a* at a fifth intersecting point 25, and a distance D1 in the tire circumferential direction from the fifth intersecting point 25 to the first straight line S1 is equal to or more than 2 mm and equal to or less than 12 mm, preferably equal to or more than 2 mm and equal to or less than 8 mm. If the distance D1 in the tire circumferential direction from the fifth intersecting point 25 to the first straight line S1 is shorter than 2 mm, the radius of curvature of the wind-up side cord 20*a* becomes accordingly larger, and the angle of inclination of the wind-up side cord 20*a* with respect to the tire circumferential direction PD becomes larger in the vicinity of the inner end 6Ei of the chafer. Therefore, the effect of suppressing the shear deformation in the tire circumferential direction is small. On the other hand, if the distance D1 in the tire circumferential direction from the fifth intersecting point 25 to the first straight line S1 is longer than 12 mm, the radius of curvature of the wind-up side cord 20*a* becomes accordingly smaller, and the angle of inclination tends to rapidly change in the boundary between the wind-up side cord 20*a* and the turn-up side cord 20*b* (details of which will be mentioned later).

In the cord 20 arranged in the chafer 6, a portion positioned in the outer side in the tire width direction is set to the turn-up side cord 20*b*. A point at which the turn-up side cord 20*b* intersects with a tire circumferential line Z3 passing through a position which is 7 mm inside in the tire radial direction from the outer end 6Eo of the chafer is set to a third intersecting point 23. Further, a point at which the turn-up side cord 20*b* intersects with a tire circumferential line Z4 passing through an innermost end 11E in the tire width direction of the bead core 11 is set to a fourth intersecting point 24. At this time, the turn-up side cord 20*b* is arranged in such a manner that an angle $\alpha$2 of inclination of a virtual second straight line S2 connecting the third intersecting point 23 and the fourth intersecting point 24 with respect to the tire circumferential direction PD is between 30 and 50 degrees. The turn-up side cord 20*b* is preferably arranged in such a manner that the angle $\alpha$2 of inclination is between 35 and 45 degrees. If the angle $\alpha$2 of inclination of the turn-up side cord 20*b* is smaller than 30 degrees, an interlayer strain becomes larger with respect to the carcass ply 4, and a deterioration of the durability is caused. On the other hand, if the angle $\alpha$2 of inclination of the turn-up side cord 20*b* is larger than 50 degrees, the intersecting angle between the turn-up side cord 20*b* and the ply cord of the carcass ply 4 becomes smaller. Accordingly, a protruding deformation of the bead portion 1 becomes larger, and the deterioration of the durability is caused.

The turn-up side cord 20*b* is formed as a circular arc shape which is convex to an outer side in the tire radial direction between the third intersecting point 23 and the fourth intersecting point 24. Accordingly, the turn-up side cord 20*b* can prevent a rapid angle change between the third intersecting point 23 and the fourth intersecting point 24.

The turn-up side cord 20*b* is equal to or less than 5 degrees in the change of the angle of inclination with respect to the tire circumferential direction between the third intersecting point 23 and the fourth intersecting point 24, and is preferably less than 5 degrees. In other words, it is preferable that the turn-up side cord 20*b* approximately coincides with the second straight line S2 between the third intersecting point 23 and the fourth intersecting point 24.

Further, it is preferable that a tire circumferential line Z6 positioned at the midpoint of the tire circumferential line Z3 which passes through the third intersecting point 23 and the tire circumferential line Z4 which passes through the fourth intersecting point 24 intersects with the turn-up side cord 20*b* at a sixth intersecting point 26, and a distance D2 in the tire circumferential direction from the sixth intersecting point 26 to the second straight line S2 is equal to or more than 0 mm and equal to or less than 3.0 mm, and it is more preferable that the distance D2 is equal to or more than 0 mm and equal to or less than 2.0 mm. As long as the distance D2 in the tire circumferential direction is in this region, it is possible to appropriately hold the angle of inclination of the turn-up side cord 20*b* with respect to the tire circumferential direction PD in the vicinity of the outer end 6Eo of the chafer, thereby well suppressing the compression deformation in the tire radial direction PD.

The boundary portion between the wind-up side cord 20*a* and the turn-up side cord 20*b*, particularly the portion between the second intersecting point 22 and the fourth intersecting point 24 approximately is a straight line, and is set in such a manner as to be successive with the circular arc portion of the wind-up side cord 20*a* and the circular arc portion of the turn-up side cord 20*b* being as smoothly as possible.

The end number of the chafer 6 (the cord number per 1 inch in the width direction of the cord 20) is preferably equal to or more than 7.0 and equal to or less than 13.0 between the first intersecting point 21 and the second intersecting point 22, and is preferably equal to or more than 8.0 and equal to or less than 13.0 between the third intersecting point 23 and the fourth intersecting point 24. As long as the end number of the chafer 6 is in these ranges, the angle of inclination of the cord 20 with respect to the tire circumferential direction becomes a desired range, thereby effectively suppressing the deformation in the inner side and the outer side in the tire width direction of the bead portion 1.

The pneumatic radial tire according to the present invention is the same as the normal pneumatic tire except the structure mentioned above of the bead portion 1, and the material, the shape, the structure, the manufacturing method and the like which have been conventionally known can be employed in the present invention. For example, a plurality of carcass plies 4 may be arranged in piles as long as at least one carcass ply 4 is arranged.

Since the pneumatic radial tire according to the present invention is excellent in the durability of the bead portion, it is useful as a pneumatic radial tire for a heavy load which is used in a vehicle having a heavy vehicle weight such as a truck, a bus, an industrial vehicle, a construction vehicle and the like.

EXAMPLES

Since a durability test of the bead portion was carried out as follows for specifically showing the structure and the effect of the present invention, a description will be given below. A size of the tire provided for the test is 11R22.5, and the tire was installed to a rim having a rim size according to JATMA provision.

In the durability test, under a condition of an internal pressure 900 kPa and a speed 40 km/h, the tire was traveled on a drum while increasing a load step by step from 230% normal condition of JATMA. The test was finished at a time point that the tire can not travel due to a failure of the bead portion, and the tire was evaluated by a traveling distance.

Example 1

The tire having the tire structure shown in FIGS. 1 to 3 was set to an example 1. The distance D1 in the tire circumferential direction from the fifth intersecting point 25 to the first straight line S1 was set to 2.7 mm, and the distance D2 in the tire circumferential direction from the sixth intersecting point 26 to the second straight line S2 was set to 1.4 mm.

Comparative Example 1

The structure was set to the same as the example 1 except the matter that the distance D1 in the tire circumferential direction from the fifth intersecting point 25 to the first straight line S1 was set to 1.8 mm, and the distance D2 in the tire circumferential direction from the sixth intersecting point 26 to the second straight line S2 was set to 2.0 mm, in the tire structure shown in FIGS. 1 to 3.

Comparative Example 2

The structure was set to the same as the example 1 except the matter that the wind-up side cord is structured such that the angle change is not generated (such as to be approximately linear) between the first intersecting point and the second intersecting point, and the turn-up side cord is formed as a circular arc shape which is convex to the inner side in the tire radial direction between the third intersecting point and the fourth intersecting point, in the tire structure shown in FIGS. 1 to 3.

As the result of the durability test, the comparative example 1 was 9000 km, the comparative example 2 was 11000 km, and the example 1 was 13000 km. In the example 1, the deformation in the inner side and the outer side in the tire width direction of the bead portion was effectively suppressed, and it is known that the durability of the bead portion is improved.

What is claimed is:

1. A pneumatic radial tire comprising:

a carcass ply which extends between bead cores arranged in a pair of bead portions, and is turned up to an outer side in a tire radial direction around the bead cores; and a chafer which is arranged around the bead cores in such a manner as to enwrap the carcass ply from an inner side to an outer side in a tire width direction, wherein a wind-up side cord of the chafer positioned in the inner side in the tire width direction is arranged in such a manner that an angle of inclination of a first straight line with respect to a tire circumferential direction is 20 to 40 degrees, the first straight line connecting a first intersecting point intersecting with a tire circumferential line passing through a position which is 7 mm inside in the tire radial direction from an inner end of the chafer, and a second intersecting point intersecting with a tire circumferential line passing through an innermost end in the tire width direction of the bead core, and is formed as a circular arc shape which is convex to an outer side in the tire radial direction between the first intersecting point and the second intersecting point, wherein a turn-up side cord of the chafer positioned in the outer side in the tire width direction is arranged in such a manner that an angle of inclination of a second straight line with respect to the tire circumferential direction is 30 to 50 degrees, the second straight line connecting a third intersecting point intersecting with a tire circumferential line passing through a position which is 7 mm inside in the tire radial direction from an outer end of the chafer, and a fourth intersecting point intersecting with the tire circumferential line passing through the innermost end in the tire width direction of the bead core, and is equal to or less than 5 degrees in a change of the angle of inclination with respect to the tire circumferential direction between the third intersecting point and the fourth intersecting point, and wherein a tire circumferential line passing through a position which is 20 mm outside in the tire radial direction from the second intersecting point intersects with the wind-up side cord at a fifth intersecting point, and a distance in the tire circumferential direction from the fifth intersecting point to the first straight line is equal to or more than 2 mm and equal to or less than 12 mm.

2. The pneumatic radial tire according to claim 1, wherein the wind-up side cord between the first intersecting point and the second intersecting point is formed as a circular arc shape having a radius of curvature which is equal to or more than 100 mm and equal to or less than 350 mm.

3. The pneumatic radial tire according to claim 1, wherein a tire circumferential line positioned at the midpoint of a tire circumferential line which passes through the third intersecting point and a tire circumferential line which passes through the fourth intersecting point intersects with the turn-up side cord at a sixth intersecting point, and a distance in the tire circumferential direction from the sixth intersecting point to the second straight line is equal to or more than 0 mm and equal to or less than 3.0 mm.

* * * * *